(12) United States Patent
Horiuchi et al.

(10) Patent No.: US 7,750,111 B2
(45) Date of Patent: Jul. 6, 2010

(54) POLYARYLENE SULFIDE AND ITS PRODUCTION METHOD

(75) Inventors: Shunsuke Horiuchi, Nagoya (JP); Koji Yamauchi, Nagoya (JP)

(73) Assignee: Toray Industries, Inc. (JP)

( * ) Notice: Subject to any disclaimer, the term of this patent is extended or adjusted under 35 U.S.C. 154(b) by 26 days.

(21) Appl. No.: 11/992,328

(22) PCT Filed: Sep. 20, 2006

(86) PCT No.: PCT/JP2006/318567

§ 371 (c)(1), (2), (4) Date: Mar. 20, 2008

(87) PCT Pub. No.: WO2007/034800

PCT Pub. Date: Mar. 29, 2007

(65) Prior Publication Data

US 2009/0234068 A1    Sep. 17, 2009

(30) Foreign Application Priority Data

Sep. 22, 2005  (JP) ............................. 2005-275520
Jan. 17, 2006  (JP) ............................. 2006-008277

(51) Int. Cl.
*C08G 75/14* (2006.01)
*C08L 81/04* (2006.01)

(52) U.S. Cl. ....................... 528/388; 524/609

(58) Field of Classification Search ................. 524/609; 528/388

See application file for complete search history.

(56) References Cited

U.S. PATENT DOCUMENTS 3,141,459 A    7/1964   Orcutt
3,793,256 A    2/1974   Scoggin
5,869,599 A    2/1999   Hay et al.

FOREIGN PATENT DOCUMENTS

| JP | 45-3368 | 2/1970 |
|----|---------|--------|
| JP | 1-25493 | 5/1989 |
| JP | 2-182727 A | 7/1990 |
| JP | 3-41152 A | 2/1991 |
| JP | 4-55445 | 9/1992 |
| JP | 5-163349 A | 6/1993 |
| JP | 6-172530 A | 6/1994 |
| JP | 9-286860 A | 11/1997 |
| JP | 2000-508359 | 7/2000 |
| JP | 2000-246733 A | 9/2000 |
| JP | 2000-281786 A | 10/2000 |
| JP | 3141459 | 12/2000 |
| JP | 3216228 | 8/2001 |
| JP | 2001-261831 A | 9/2001 |
| JP | 2003-113242 A | 4/2003 |
| JP | 2004-182840 A | 7/2004 |

OTHER PUBLICATIONS

Dean A. Zimmerman et al., "Polymerization of poly(p-phenylene sulfide) from a cyclic precursor", Polymer Vo. No. 14, pp. 3111-3116, 1996.

*Primary Examiner*—Peter Szekely
(74) *Attorney, Agent, or Firm*—DLA Piper LLP (US)

(57) ABSTRACT

A polyarylene sulfide has a narrow molecular weight distribution and a high molecular weight and high purity which is industrially useful, wherein the polyarylene sulfide has a weight average molecular weight of 10,000 or more, and weight loss when heated, $\Delta Wr=(W1-W2)/W1 \times 100 \leq 0.18$ (%) (wherein $\Delta Wr$ is weight loss ratio (%), W1 is sample weight when arrived at 100° C. and W2 is sample weight when arrived at 330° C.). Its production method includes a polyarylene sulfide prepolymer which contains a cyclic polyarylene sulfide at least 50 wt % or more, and of which weight average molecular weight is less than 10,000 is heated to be converted to a high polymer of which weight average molecular weight is 10,000 or more.

24 Claims, No Drawings

POLYARYLENE SULFIDE AND ITS PRODUCTION METHOD

RELATED APPLICATION

This is a §371 of International Application No. PCT/JP2006/318567, with an international filing date of Sep. 20, 2006 (WO 2007/034800 A1, published Mar. 29, 2007), which is based on Japanese Patent Application Nos. 2005-275520, filed Sep. 22, 2005, and 2006-008277, filed Jan. 17, 2006.

TECHNICAL FIELD

This disclosure relates to polyarylene sulfides of narrow molecular weight distribution, high molecular weight and high purity which is industrially useful, and relates to production methods of the polyarylene sulfides having these advantages.

BACKGROUND ART

Polyarylene sulfide (hereafter, may be abbreviated as PAS) represented by polyphenylene sulfide (hereafter, may be abbreviated as PPS) is a resin which has preferable properties such as excellent heat resistance, barrier properties, chemical resistance, electric insulation, hot wet resistance or flame resistance, as an engineering plastic. It is moldable by injection molding or extrusion molding into various molded parts such as a film, a sheet or a fiber, and widely used in the fields such as of various electric electronic parts, mechanical parts and automobile parts in which heat resistance and chemical resistance are required.

As a production method of PAS, a method of reacting alkali metal sulfides such as sodium sulfide and polyhalogenated aromatic compounds such as p-dichlorobenzene in organic amide solvents such as N-methyl-2-pyrrolidone is known, and this method is widely employed as an industrial production method of PAS. However, in that production method, it is necessary to carry out the reaction at a high temperature, a high pressure and under a strong alkaline condition, and further, expensive polar solvents of high boiling point such as N-methyl pyrrolidone are necessary, and it has a problem that a great process cost is needed since it is energy exhaustive type in which a great cost is needed for solvent recycling.

Furthermore, since the polymerization reaction is of a polycondensation mechanism, side products such as sodium chloride are produced. Accordingly, a removing step of the byproduced salt is necessary after the polymerization reaction. However, it is difficult to completely remove the byproduced salt by ordinary treatment, and in commercially available and widely used PPS products, about 1,000 to 3,000 ppm in alkali metal content is contained. When an alkali metal salt is left in the produced polymers, such problems as damaging physical characteristics including electric characteristics arises. Accordingly, when a molded article in which such a polyarylene sulfide is used as the raw material is used in the field of electric or electronic parts, deterioration of electric characteristics by the alkali metal in the polyarylene sulfide becomes a big obstacle.

Furthermore, polyarylene sulfide obtained by that method contains low molecular weight components, wherein the polydispersity expressed by the ratio of weight average molecular weight and number average molecular weight is very large and it is a polymer of a broad molecular weight distribution. For that reason, when it is used for a mold processing application, sufficient mechanical characteristics are not exhibited, and problems arose that an amount of gas component when heated was large, soluble amount when contacted with a solvent was large, etc. To solve these problems, for example, a step of forming a cross-linking structure to thereby convert it to a high molecular weight by subjecting to a vapor phase oxidation treatment under oxidizing atmosphere such as in the air, becomes necessary, but the process became further complicated and productivity also decreased (e.g., refer to JP-S45-3368 B (pages 7 to 10)).

As methods of improving one of the above-mentioned problems of PAS, that is, as a method to improve that the molecular weight distribution is broad since PAS contains low molecular weight components, a method of purification by phase separating a mixture of PAS containing impurities to a molten polymer phase containing PAS and a solvent phase mainly comprising solvent at a temperature higher than the lowest temperature at which PAS forms a molten phase, to thereby heat extract the impurities, or a method of precipitating and collecting granular polymer after cooling, is known. In that method, it is expected that the metal content of PAS is decreased and the molecular weight distribution is narrowed since the impurities are extracted by the heat extraction effect, but the effect was insufficient, and, the process was complicated since it was a method in which an expensive solvent were used (e.g., JP-H1-25493 B (page 23) and JP-H4-55445 B (pages 3 to 4)).

As another method for solving the above-mentioned problem, that is, the problem that PAS contains low molecular weight components and has a broad molecular weight distribution, a PAS of which ratio of weight average molecular weight Mw and number average molecular weight Mn, Mw/Mn, is in the range of 2 to 5, which is produced by a method characterized in that a sulfur source and dihaloaromatic compound were reacted in an organic polar solvent under a condition of a temperature 220 to 280° C. for 0.1 to 2 hours and the PAS obtained was washed with an organic polar solvent under a condition of a temperature 100 to 220° C., is disclosed. In that production of PAS, since PAS of narrow molecular weight distribution is obtained by removing low molecular weight components by washing with an organic solvent at a high temperature, the yield of PAS was low, and, even in the PAS of the lowest polydispersity substantially obtained, Mw/Mn=2.9, and the effect was insufficient. Furthermore, in that method, since expensive lithium compound is used in the polymerization of PAS, there remained many problems to be solved, such as that it is not economical or the lithium remains in PAS considerably (e.g., refer to JP-H2-182727 A (pages 9 to 13)).

As a method of improving the insufficient molecular weight distribution of the above-mentioned PAS, a PAS obtained by a production method characterized in that, an alkali metal sulfide and/or an alkali earth metal sulfide and a polyhalogenated aromatic compound are polymerized in an aprotic organic solvent, and to the obtained polymerization solution containing PAS polymerization reaction product, 5 to 50 wt % water with respect to the whole solution and an inorganic and/or organic acid to acidify the above-mentioned polymerization solution are added, and at a temperature higher than the lowest temperature at which the PAS polymerization reaction product forms a molten phase, the polymerization solution is phase separated to a solvent phase and a molten polymer phase to thereby the molten polymer phase is collected, is disclosed. By this method, it is expected that a PAS of a narrow molecular weight distribution having a polydispersity, Mw/Mn, around 1.9 is obtained. However, in that method, since a method of separating low molecular weight components from PAS is employed by subjecting PAS having a broad molecular weight distribution to an extraction treatment in a molten state at a high temperature and a high pressure, the process is complicated and the yield of PAS obtained is low as 80% or less. Further, in that polymerization of PAS, expensive lithium compound is used, and there remains a problem that residual lithium in the polymer may be present (e.g., JP-H9-286860 A (pages 5 to 6)).

Furthermore, as a production method of PAS having a narrow molecular weight distribution, a method of heating ring-opening polymerization of a cyclic arylene sulfide oligomer in the presence of an ionic ring-opening polymerization catalyst, is known. In that method, which is different from the above-mentioned JP-H1-25493 B (page 23) and JP-H4-55445 B (pages 3 to 4), it is expected that a PAS having a narrow molecular weight distribution is obtained without the complicated organic solvent cleaning operation. However, in that method, since an alkali metal salt of sulfur such as sodium salt of thiophenol is used as the ring-opening polymerization catalyst in the synthesis of PAS, there was a problem that much amount of alkali metal remains in the PAS. In the case where the amount of the residual alkali metal is decreased by decreasing the amount used of the ring-opening polymerization catalyst, there was a problem that molecular weight of PAS obtained becomes insufficient (e.g., JP Patent No. 3216228, specification (pages 7 to 10), and U.S. Pat. No. 3,141,459, specification (pages 5 to 6)).

As a method of solving the problem of PAS obtained by the above-mentioned method, i.e., a method of decreasing the amount of residual alkali metal in PAS, a production method of PAS in which a cyclic aromatic thioether oligomer is ring-opening polymerized by heating under presence of a polymerization initiator which generates a sulfur radical, is known. In that method, since a nonionic compound is used as a polymerization initiator, it is expected that an alkali metal content of the obtained PAS is decreased. However, glass transition temperature of the polyphenylene sulfide obtained by that method is low at 85° C. This is because the molecular weight is low and the polyphenylene sulfide contains low molecular weight components and the molecular weight distribution is broad, and it was insufficient in view of molecular weight and narrow molecular weight distribution. Furthermore, although there is no disclosure about a weight loss ratio when heated of the polyphenylene sulfide obtained by the method, since the polymerization initiator used in the method has a lower molecular weight compared to that of the polyphenylene sulfide and its heat stability is also inferior, it was feared that much amount of gas is generated when the polyphenylene sulfide obtained by that method is heated, and its molding processability is poor (e.g., U.S. Pat. No. 5,869,599, specification (pages 27 to 28)).

Furthermore, in the ring-opening polymerization in the production method of PAS disclosed in JP Patent No. 3216228, specification (pages 7 to 10), U.S. Pat. No. 3,141,459, specification (pages 5 to 6), and U.S. Pat. No. 5,869,599, specification (pages 27 to 28), it is described that it is preferable to use a high purity cyclic polyarylene sulfide oligomer which substantially does not contain a linear polyarylene sulfide as its monomer source, and only an extremely small amount of linear polyarylene sulfide is admitted. In general, since cyclic oligomer is obtained as a mixture with much amount of linear oligomer, a purification operation of high level is necessary to obtain a high purity cyclic oligomer, and this becomes a cost factor relative to the amount of PAS obtained. Thus, a method which allows the use of a mixture of cyclic oligomer and linear oligomer as a monomer source in the ring-opening polymerization has been desired.

On the other hand, a polymerization method of PPS in which a mixture of cyclic PPS and linear PPS is heated as monomer source is also known (POLYMER, Vol. 37, No. 14, 1996 (pages 3111 to 3116)). This method is an easy polymerization method of PPS, but the degree of polymerization of the obtained PPS was low and it is a PPS which is improper for practical use. That publication discloses that the degree of polymerization could be increased by raising the heating temperature, but yet it did not arrive at a molecular weight suitable for practical use, and in this case, formation of a cross-linked structure could not be avoided and it was pointed out that only a PPS which is poor in thermal characteristics could be obtained. Thus, a polymerization method of a PPS of high quality suitable for practical use has been desired.

On the other hand, as methods of decreasing weight loss ratio when heated of PAS, conventionally many proposals were made regarding heat treating method of PAS, for example, a method of heat treating polyphenylene sulfide under oxygen atmosphere at a temperature lower than its melting point, or a method of heat treating polyphenylene sulfide in an inert gas atmosphere at a temperature lower than its melting point, etc. (e.g., U.S. Pat. No. 3,793,256, specification (page 2), and JP-H3-41152 A (claims)). Although in the polyarylene sulfide obtained by these methods, in fact, compared to the PAS which is not subjected to a heat treatment, weight loss ratios when heated are apt to decrease, but yet their weight loss ratios when heated are not at a level which can be satisfied. Furthermore, the polyphenylene sulfide obtained by that method contains low molecular weight components, and its polydispersity which is expressed by the ratio of weight average molecular weight and number average molecular weight is very large. Thus, the problems that it is a polymer of which the molecular weight distribution was broad, and is a polymer of low purity of which alkali metal content is very high, were not solved.

As another method of heat treating PAS, a PAS resin pellet obtained by melt-extruding while purging a vent port with nitrogen while keeping a vent port under a reduced pressure when PAS resin is melt-extruded by using an extruder equipped with a vent port, is known (e.g., JP 2000-246733 A (page 4)). In that method, since the heat treatment is carried out at melting temperature of PAS or more under a reduced pressure condition, a degassing effect during the heat treatment is excellent and it is expected that the weight loss ratio when heated of the PAS obtained by that method is decreased, but its level was not yet a level which could be satisfied. Furthermore, the PAS pellet according to that method had also a molecular weight distribution characteristics and alkali metal content characteristics similar to those of the above-mentioned polyphenylene sulfide, and it could not be said that the purity was sufficiently high.

It could therefore be advantageous to provide polyarylene sulfides having a narrow molecular weight distribution and of a high molecular weight, a high purity and industrially useful, and production methods of polyarylene sulfide having such advantages.

SUMMARY

We provide:
1. A polyarylene sulfide characterized in that the weight average molecular weight is 10,000 or more, and weight loss when heated satisfy the following equation:

$$\Delta Wr = (W1 - W2)/W1 \times 100 \leq 0.18 (\%)$$

(wherein $\Delta Wr$ is a weight loss ratio (%) and it is a value determined from a sample weight (W2) when arrived at 330° C. with respect to a sample weight (W1) when arrived at 100° C. when a thermogravimetric analysis is carried out up to a predetermined temperature from 50° C. to 330° C. or more at a heating rate of 20° C./min in non-oxidizing atmosphere under normal pressure); and 2. A production method of polyarylene sulfide characterized in that a polyarylene sulfide prepolymer which contains at least 50 wt % or more of cyclic polyarylene sulfides and has a weight average molecular weight less than 10,000 is heated and converted into a high polymer having weight average molecular weight of 10,000 or more.

It is thus possible to provide industrially useful polyarylene sulfides having a narrow molecular weight distribution and of a high molecular weight and high purity, and production methods of polyarylene sulfide having such advantages.

DETAILED DESCRIPTION

Hereafter, representative examples of our polyarylene sulfides and production methods are explained.

(1) PAS

The PAS is a homopolymer or a copolymer in which the repeating unit of formula —(Ar—S)— is the main constituting unit, preferably the repeating unit is contained 80 mol % or more. As the Ar, there are units such as represented by the following formulas (A) to (K), but among them, the formula (A) is especially preferable:

Chemical formula 1

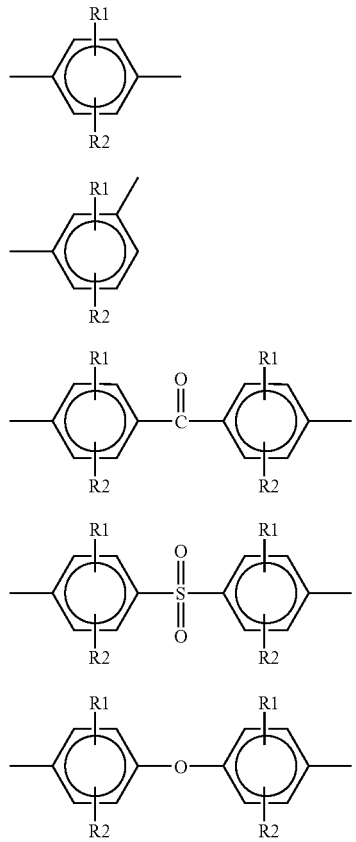

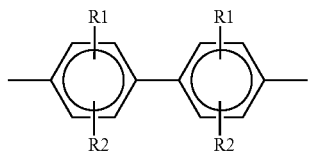

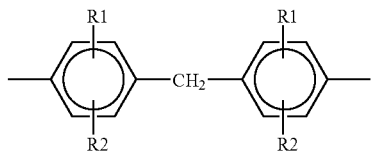

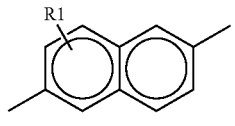

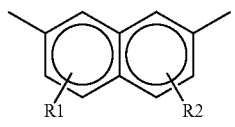

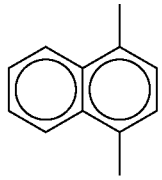

(R1 and R2 are substituents selected from hydrogen, an alkyl group of a number of carbon atoms 1 to 12, an alkoxy group of a number of carbon atoms 1 to 12, arylene group of a number of carbon atoms 6 to 24 or a halogen group, R1 and R2 may be the same or different).

As far as this repeating unit is the main constituting unit, it is possible to contain a small amount of branch or cross-linking units expressed by the following formulas (L) to (N). It is preferable that the copolymerization ratio of these branch or cross-linking units is in the range of 0 to 1 mol % with respect to —(Ar—S)— unit 1 mol.

Chemical formula 2

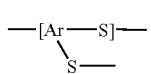

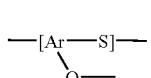

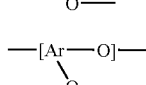

Furthermore, the PAS may be any one of a random copolymer, a block copolymer or a mixture thereof containing the above-mentioned repeating units.

As representative ones of these, polyphenylene sulfide, polyphenylene sulfide sulfone, polyphenylene sulfide ketone, random copolymer thereof, block copolymer thereof and a mixture thereof, are mentioned. As especially preferable PAS, polyphenylene sulfide (hereafter, may be abbreviated as PPS) which contains p-phenylene sulfide unit as a main constituting unit of the polymer.

Chemical formula 3

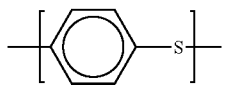

in an amount of 80 mol % or more, especially 90 mol % or more, is mentioned.

The molecular weight of PAS is, in weight average molecular weight, 10,000 or more, preferably 15,000 or more, more preferably 18,000 or more. When the weight average molecular weight is less than 10,000, moldability at processing is low, and characteristics such as mechanical strength or chemical resistance of molded article becomes poor. Although there is especially no upper limit of weight average molecular weight, but less than 1,000,000 can be exemplified as a preferable range, more preferably less than 500,000, further preferably less than 200,000, and in this range, a high molding processability can be obtained.

Regarding the broadness of the molecular weight distribution of PAS, i.e., the polydispersity expressed by the ratio of weight average molecular weight and number average molecular weight (weight average molecular weight/number average molecular weight), 2.5 or less is preferable, 2.3 or less is more preferable, 2.1 or less is further preferable, 2.0 or less is still further preferable. In the case where the polydispersity exceeds 2.5, low molecular weight component contained in PAS may increase, and this may cause a decrease of mechanical characteristics when the PAS is used for mold processing applications, an increase of gas generation amount when heated and an increase of amount of dissolving out component when contacted with a solvent, etc. The above-mentioned weight average molecular weight and number average molecular weight can be determined by using, for example, a SEC (size exclusion chromatography) equipped with a differential refractive index detector.

Furthermore, the melt viscosity of PAS is not especially limited, but usually, melt viscosity in the range of 5 to 10,000 Pa·s (300° C., shear rate 1000/sec) can be exemplified as a preferable range.

The PAS is characterized by being of a high purity compared to conventional ones, and it is preferable that an alkali metal content which is an impurity is 100 ppm or less. Preferable alkali metal content is less than 50 ppm, more preferably 30 ppm or less, further preferably 10 ppm or less. When the alkali metal content exceeds 100 ppm, a possibility of being limited in application of PAS may increase, for example, reliability decreases in an application which requires electrical insulation characteristics of a high level. The alkali metal content of PAS is a value calculated from, for example, an amount of alkali metal in the ash which is the residue of PAS incinerated by using an electric furnace or the like, and by analyzing the above-mentioned ash by, for example, ion chromatography or atomic absorption spectrometry, a quantitative analysis is possible.

The alkali metal means lithium, sodium, potassium, rubidium, cesium, francium of Group IA of the periodic table, but it is preferable that the PAS does not contain other alkali metal than sodium. In the case where an alkali metal other than sodium is contained, it may damage electrical characteristics or thermal characteristics of PAS. It can be a factor of increasing the amount of dissolved out metal when PAS contacts various solvents, and especially, when PAS contains lithium, this inclination becomes serious. By the way, among various metals, compared to other metals than alkali metal, for example, alkali earth metals or transition metals, alkali metal has a greater influence on the electrical characteristics, thermal characteristics and the amount of dissolved out metal of PAS. Accordingly, among the various kinds of metal, by suppressing especially the alkali metal content in the above-mentioned range, it is estimated that the quality of PAS can be improved.

Furthermore, it is preferable that the PAS does not substantially contain halide other than chloride, i.e., fluoride, bromide, iodide, astatide. In the case where the PAS contains chlorine as a halogen, since PAS is stable in a temperature region usually used, when a small amount of chlorine is contained, its influence on mechanical characteristics of PAS is small, but in the case where halogens other than chlorine is contained, properties characteristic to them may aggravate characteristics of PAS, for example, electrical characteristics or residence stability. In the case where the PAS contains chlorine as a halogen, its preferable amount is 1 wt % or less, more preferably 0.5 wt % or less and further preferably 0.2 wt % or less, and in this range, electrical characteristics or residence stability of the PAS may become better.

An important characteristic of the PAS is that the weight loss when heated satisfies the following equation (1):

$$\Delta Wr = (W1 - W2)/W1 \times 100 \leq 0.18 (\%) \quad (1),$$

wherein $\Delta Wr$ is a weight loss ratio (%) and it is a value determined from a sample weight ($W2$) when arrived at 330° C. with respect to a sample weight ($W1$) when arrived at 100° C. when a thermogravimetric analysis is carried out up to a predetermined temperature from 50° C. to 330° C. or more at a heating rate of 20° C./min in non-oxidizing atmosphere under normal pressure.

Regarding the PAS, $\Delta Wr$ is 0.18% or less, 0.12% or less is preferable, 0.10% or less is further preferable and 0.085 or less is still further preferable. In the case where $\Delta Wr$ exceeds the above-mentioned range, it is not preferable since, for example, a problem may arise that a large amount of gas generated when the PAS is mold processed or a deposition to a die or dice at extrusion molding or to a mold at injection molding may also increase to thereby decrease productivity. As far as we know, $\Delta Wr$ of the known PAS exceeds 0.18%, but since the PAS obtained by the preferable method is different in molecular weight distribution or impurity content from those of the known PAS and is of an extremely high purity, it is estimated that the value of $\Delta Wr$ is extremely decreased.

Although it is possible to determine $\Delta Wr$ by an ordinary thermogravimetric analysis, but as an atmosphere in this analysis, a non-oxidizing atmosphere of normal pressure is employed. The non-oxidizing atmosphere means that the oxygen concentration in gas phase contacted with a sample is 5 vol % or less, preferably 2 vol % or less, further preferably, it is an atmosphere which substantially does not contain oxygen, that is, it is an inert gas atmosphere such as of nitrogen, helium or argon, and among them, from the view point of, especially, economy and easiness of handling, nitrogen atmosphere is especially preferable. The normal pressure means a pressure approximately under standard conditions, and is an atmospheric condition of absolute pressure of 101.3 kPa at a temperature of approximately 25° C. When the atmosphere of measurement is other than the above-mentioned, there arises a possibility that the measurement is other than a measurement agreeable to practical use of the PAS such that an oxidation or the like of PAS may occur during measurement or it is much different from an atmosphere of an actual mold processing of the PAS.

In the measurement of $\Delta Wr$, a thermogravimetric analysis is carried out by raising the temperature up to a predetermined temperature from 50° C. to 330° C. or more at a heating rate of 20° C./min. Preferably, after holding at 50° C. for one minute, by raising the temperature at a heating rate of 20° C./min, a thermogravimetric analysis is carried out. This temperature range is the temperature region often employed when a PAS represented by polyphenylene sulfide is practically used, and it is also the temperature region often employed when a PAS of a solid state is molten and molded into a desired shape. The weight loss ratio in such a temperature region of practical use relates to an amount of generated gas from PAS at the time of practical use, or an amount of the component deposited to a die or mold or the like at mold processing. Accordingly, it can be said that a PAS of which weight loss ratio in such a temperature range is small is an excellent PAS of high quality. It is preferable that the measurement of $\Delta Wr$ is carried out with an amount of sample of around an approximately 10 mg, and it is preferable that a shape of the sample is a fine particle state of an approximately 2 mm or less.

In general, the amount of weight loss when heating a thermosetting resin or a thermoplastic resin is apt to be large as the temperature becomes high, and it is known that this inclination can also be applied to PAS. In consideration of such an inclination, we analyzed in detail the temperature dependency of the amount of weight loss when heated of the PAS and known PAS and, as a result, found that, in the case where the weight loss ratio of PAS is determined according to the above-mentioned thermogravimetric analysis condition, there is a relation of the following equations (2) and (3) between the weight loss ratio and the temperature T:

$$\Delta Wr1 = \Delta Wt1 - (1.0 \times 10^{-3} \times T1) \quad (2)$$

$$\Delta Wr2 = \Delta Wt2 + (1.0 \times 10^{-3} \times T2) \quad (3).$$

In the equation (2), $\Delta Wt1$ is a weight loss ratio (%) obtained by the following equation (1)' from the difference of sample weight (Wt1) at an desired temperature T1 with respect to a sample weight (W) when arrived at 100° C., when a thermogravimetric analysis is carried out up to the desired temperature exceeding 330° C. at a heating rate of 20° C./min in non-oxidizing atmosphere under normal pressure:

$$\Delta Wt1 = (W - Wt1)/W \times 100(\%) \quad (1)'.$$

The weight loss ratio $\Delta Wr$ of the PAS is, as the above-mentioned, based on the sample weight at the time of 330° C. of the value of the thermogravimetric analysis, but by employing the relation of equation (2), the $\Delta Wr$ value can be estimated from the weight loss ratio $\Delta Wt1$ which is based on a sample weight at a temperature exceeding 330° C.

In the equation (3), $\Delta Wt2$ is a weight loss ratio (%) obtained by the following equation (1)" from the difference of a sample weight (Wt2) at a desired temperature T2 with respect to a sample weight (W) when arrived at 100° C., when a thermogravimetric analysis is carried out from 50° C. up to a desired temperature T2 of 270° C. or more and less than 330° C. at a heating rate of 20° C./min in non-oxidizing atmosphere under normal pressure:

$$\Delta Wt2 = (W - Wt2)/W \times 100(\%) \quad (1)''.$$

The weight loss ratio $\Delta Wr$ of the PAS is, as the above-mentioned, based on the sample weight at the time of 330° C. of the value of the thermogravimetric analysis, but by employing the relation of equation (3), the $\Delta Wr$ value can be estimated from the weight loss ratio $\Delta Wt2$ which is based on a sample weight in a temperature of 270° C. or more and less than 330° C. In the case where the upper limit of the temperature of measurement in the thermogravimetric analysis is less than 270° C., since PAS may not melt or, even if melted, its flowability may be low, it cannot be said that such a temperature range of measurement is a temperature range suitable for practical use, and in view of using as an evaluation standard of PAS quality, it is preferable that the above-mentioned range is employed as the temperature range of measurement.

It is not clear at present as to the reason why the weight loss ratio when heated of the PAS exhibits an extremely excellent thermogravimetric characteristics which satisfies the above-mentioned equation (1), but it is estimated that the PAS, by exhibiting the effect of the small amount of impurity component other than the PAS component, shows an extremely small weight loss ratio which could not be achieved by known PAS.

It is preferable that the PAS which has characteristics of the above-mentioned equation (1), as mentioned later, is produced by heating a polyarylene sulfide prepolymer containing a cyclic polyarylene sulfide to thereby convert it to a highly polymerized substance. The conversion to the highly polymerized substance is explained later, but a PAS of which weight ratio of the cyclic PAS after subjecting to an operation to convert the polyarylene sulfide prepolymer to a highly polymerized substance is 40% or less, preferably 25% or less, more preferably 15% or less is preferable since the above-mentioned $\Delta Wr$ value becomes especially small. In the case where this value exceeds the above-mentioned range, $\Delta Wr$ value may increase, and the reason thereof is not clear at present but it is believed to be due to partial evaporation when heated of the cyclic PAS contained in the PAS.

In the case where the weight loss when heated satisfies the above-mentioned equation (1) which is characteristic to the PAS, it is necessarily not necessary that the range of weight average molecular weight and the range of polydispersity and/or alkali metal content of PAS to be within the above-mentioned range, and as above-mentioned, even a PAS containing a certain amount of cyclic PAS, it is possible to satisfy the thermogravimetric characteristics of the above-mentioned equation (1). However, in the case where the range of weight average molecular weight and the range of polydispersity are within the above-mentioned range, and/or in case where an alkali metal content of PAS is within the above-mentioned range, it is preferable since weight loss when heated may become especially small.

As mentioned above, the PAS has an excellent characteristic that the heat loss, $\Delta Wr$, when heated just a little may also have an excellent characteristics that the heat loss when held at a arbitrarily selected constant temperature is also small.

Furthermore, other characteristic of the PAS is that an amount of generation of lactone type compound and/or aniline type compound when heated is remarkably small. As lactone type compounds, for example, β-propiolactone, β-butyrolactone, β-pentanolactone, β-hexanolactone, β-heptanolactone, β-octanolactone, β-nonalactone, β-decalactone, γ-butyrolactone, γ-valerolactone, γ-pentanolactone, γ-hexanolactone, γ-heptanolactone, γ-octalactone, γ-nonalactone, γ-decalactone, δ-pentanolactone, δ-hexanolactone, δ-heptanolactone, δ-octanolactone, δ-nonalactone, δ-decalactone, etc., can be exemplified, and, as aniline type compounds, aniline, N-methyl aniline, N,N-dimethyl aniline, N-ethyl aniline, N-methyl-N-ethyl aniline, 4-chloro-aniline, 4-chloro-N-methyl aniline, 4-chloro-N,N-dimethyl aniline, 4-chloro-N-ethyl aniline, 4-chloro-N-methyl-N-ethyl aniline, 3-chloro-aniline, 3-chloro-N-methyl aniline, 3-chloro-N,N-dimethyl aniline, 3-chloro-N-ethyl aniline, 3-chloro-N-methyl-N-ethyl aniline or the like can be exemplified. The generation when heated of the lactone type compound and/or aniline type compound causes a foaming of resin or staining mold at the time of mold processing, and not only worsens molding processability but also causes pollution, it is desired to be as small as possible. The amount of generation of the lactone type compound with respect to the weight of PAS before heating is preferably 500 ppm or less, more preferably 300 ppm, further preferably 100 ppm or less, still further preferably 50 ppm or less. Similarly, the amount of generation of the aniline type compound is preferably 300 ppm or less, more preferably 100 ppm, further preferably 50 ppm or less, still further preferably 30 ppm or less. As an evaluation method of the amount of generation of the lactone type compound and/or aniline type compound when PAS is heated, a method in which the gas generated when treated at 320° C. for 60 minutes in non-oxidizing atmosphere is fractioned into components by a gas chromatography and subjected to a quantitative analysis, can be exemplified.

As to the reason why the amount of generation of these compounds when the PAS is heated is small is not clear at present, but it is estimated that the fact, that the polyarylene sulfide prepolymer used in the preferable production method of the PAS is a high purity one containing cyclic polyarylene sulfide at least 50 wt % and an impurity content which generates the lactone type compound and/or aniline type compound when heated is small, contributes to it.

(2) Production Method of PAS

The production method of PAS is characterized by being produced by heating a polyarylene sulfide prepolymer which contains a cyclic polyarylene sulfide at least 50 wt % or more, and of which weight average molecular weight is less than 10,000 to thereby convert it into a high polymer of which weight average molecular weight is 10,000 or more, and by this method, the PAS having the above-mentioned characteristics can easily be obtained.

Cyclic Polyarylene Sulfide

The cyclic polyarylene sulfide in the preferable production method of the PAS is a cyclic compound of which main constituting unit is the repeating unit of formula, —(Ar—S)—, and preferably it is a compound such as of the following general formula (O) which contains 80 mol % or more of the repeating unit. As the Ar, the units such as represented by the above-mentioned Formula (A) to Formula (K) are mentioned, but among them, Formula (A) is especially preferable.

Chemical formula 4

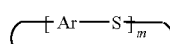

(O)

In the cyclic polyarylene sulfide, the above-mentioned repeating unit such as Formula (A) to Formula (K) may be contained in random or may be contained in block or may be any one of them including a mixture thereof. As representative ones among them, a cyclic polyphenylene sulfide, a cyclic polyphenylene sulfide sulfone, a cyclic polyphenylene sulfide ketone, a cyclic random copolymer containing them, a cyclic block copolymer or a mixture thereof, are mentioned. As especially preferable cyclic polyarylene sulfide, a cyclic polyphenylene sulfide (hereafter, may be abbreviated as cyclic PPS) containing 80 mol % or more, especially 90 mol % or more of p-phenylene sulfide unit as its main constituting unit, is mentioned.

Chemical formula 5

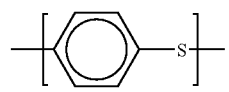

There is especially no limit in the repeating number m in the above-mentioned Formula (O) of the cyclic polyarylene sulfide, it can be exemplified that 2 to 50 is preferable, 2 to 25 is more preferable and 3 to 20 is further preferable range. As mentioned later, although it is preferable that the conversion of the polyarylene sulfide prepolymer to the highly polymerized substance is carried out at a temperature or more at which the cyclic polyarylene sulfide dissolves or melts, but since when m becomes large, dissolving or melting temperature of the cyclic polyarylene sulfide may become high, in view of capability of converting the polyarylene sulfide prepolymer to the highly polymerized substance at a lower temperature, it is advantageous to make m in the above-mentioned range.

Furthermore, the cyclic polyarylene sulfide may be any one of a single compound having a single repeating number, or a mixture of the cyclic polyarylene sulfides having different repeating number, but the mixture of the cyclic polyarylene sulfides having different repeating number is apt to have a lower dissolving or melting temperature than that of the single compound having a single repeating number, and it is preferable to use the mixture of the cyclic polyarylene sulfides having different repeating number, because the temperature at which the mixture is converted to the above-mentioned highly polymerized substance can be lowered.

The production method of PAS is characterized in that the polyarylene sulfide prepolymer containing the cyclic polyarylene sulfide as above-mentioned is heated to thereby convert it to a highly polymerized substance, but the polyarylene sulfide prepolymer used here contains at least 50 wt % or more of the cyclic polyarylene sulfide, and those containing preferably 70 wt % or more, more preferably 80 wt % or more, further preferably 90% or more, are preferable. And, regarding the upper limit of the cyclic polyarylene sulfide contained in the polyarylene sulfide prepolymer, there is especially no limit, but 98 wt % or less, or preferably 95 wt % or less can be exemplified as a preferable range. In general, as the weight ratio of the cyclic polyarylene sulfide in the polyarylene sulfide prepolymer becomes high, the degree of polymerization of PAS obtained after heating is apt to become high. That is, in the production method of the PAS, by adjusting the containing ratio of the cyclic polyarylene sulfide in the polyarylene sulfide prepolymer, the degree of polymerization of PAS obtained can easily be controlled. When the weight ratio of the cyclic polyarylene sulfide in the polyarylene sulfide prepolymer exceeds the above-mentioned upper limit, since melting temperature of the polyarylene sulfide prepolymer is apt to become high, it is preferable to make the weight ratio of the cyclic polyarylene sulfide in the polyarylene sulfide prepolymer into the above-mentioned range, because the temperature at which the polyarylene sulfide prepolymer is converted to the highly polymerized substance can be lowered.

Polyarylene Sulfide Prepolymer

It is especially preferable that the component other then the cyclic polyarylene sulfide in the polyarylene sulfide prepolymer is a linear polyarylene sulfide oligomer. The linear polyarylene sulfide oligomer is a homooligomer or cooligomer of which main constituting unit is the repeating unit of Formula —(Ar—S)—, preferably containing 80 mol % or more of the repeating unit. As the Ar, there are units such as expressed by the above-mentioned Formula (A) to Formula (K), but among them, Formula (A) is especially preferable. The linear polyarylene sulfide oligomer can contain, as far as these repeating units are the main constituting unit, a small amount of branching unit or cross-linking unit expressed such as by the above-mentioned Formula (L) to Formula (N). It is preferable that an amount of copolymerization of these branching unit or cross-linking unit is in the range of 0 to 1 mol % with respect to —(Ar—S)— unit 1 mol. The linear polyarylene sulfide oligomer may be any one of a random copolymer, a block copolymer containing the above-mentioned repeating unit and a mixture thereof.

Among them, as representative ones, a polyphenylene sulfide oligomer, a polyphenylene sulfide sulfone oligomer, a polyphenylene sulfide ketone oligomer, a random copolymer, block copolymer thereof and a mixture thereof or the like are mentioned. As especially preferable linear polyarylene sulfide oligomer, linear polyphenylene sulfide oligomer containing 80 mol % or more, especially 90 mol % or more of p-phenylene sulfide unit as main constituting unit of the polymer, is mentioned.

It is especially preferable that the amount of the linear polyarylene sulfide contained in the polyarylene sulfide prepolymer is smaller than that of the cyclic polyarylene sulfide contained in the polyarylene sulfide prepolymer. That is, it is preferable that weight ratio of the cyclic polyarylene sulfide and the linear polyarylene sulfide (cyclic polyarylene sulfide/linear polyarylene sulfide) in the polyarylene sulfide prepolymer is 1 or more, 2.3 or more is more preferable, 4 or more is further preferable, 9 or more is still further preferable, and by using such a polyarylene sulfide prepolymer, a polyarylene sulfide of weight average molecular weight is 10,000 or more can be easily obtained. Accordingly, the greater the weight ratio value of the cyclic polyarylene sulfide and the linear polyarylene sulfide in the polyarylene sulfide prepolymer, the greater the weight average molecular weight of the PAS obtained by the production method of the PAS may be, and therefore, although there is no upper limit of the weight ratio, to obtain a polyarylene sulfide prepolymer of which the weight ratio exceeds 100, it is necessary to significantly decrease the content of the linear PAS in the polyarylene sulfide prepolymer, but it needs a great effort. By the production method of the PAS, even a polyarylene sulfide prepolymer of which weight ratio is 100 or less is used, it is easily possible to obtain a PAS of a sufficiently high molecular weight.

The upper limit of the molecular weight of the polyarylene sulfide prepolymer used for the production of the PAS is, in weight average molecular weight, less than 10,000, 5,000 or less is preferable and 3,000 or less is further preferable, and on the other hand, as to the lower limit, in weight average molecular weight, 300 or more is preferable, 400 or more is preferable, 500 or more is further preferable.

The PAS is characterized by being of high purity, and it is preferable that the polyarylene sulfide prepolymer used for its production is also of a high purity. Accordingly, as to a content of alkali metal which is an impurity, 100 ppm or less is preferable, less than 50 ppm is more preferable, 30 ppm or less is further preferable and 10 ppm or less is still further preferable. At producing the PAS, in the case where the method in which the polyarylene sulfide prepolymer is heated to convert to a highly polymerized substance is employed, since the alkali metal content of the obtained PAS, usually, depends on the alkali metal content of the polyarylene sulfide prepolymer, when the alkali metal content of the polyarylene sulfide prepolymer exceeds the above-mentioned range, the alkali metal content of the obtained PAS may exceed the range of the alkali metal content of the PAS. The alkali metal content of the polyarylene sulfide prepolymer is, for example, the value calculated from the alkali metal in the ash which is the residue of incineration of the polyarylene sulfide prepolymer by an electric furnace or the like, and it can be quantitatively analyzed by analyzing the above-mentioned ash by, for example, an ion chromatography or an atomic absorption spectrometry.

Alkali metal means lithium, sodium, potassium, rubidium, cesium, francium of Group IA of the periodic table, but it is preferable that the polyarylene sulfide prepolymer does not contain other alkali metal than sodium. The polyarylene sulfide prepolymer does not substantially contain other halogen than chlorine.

Furthermore, when the polyarylene sulfide prepolymer is heated to convert to a highly polymerized substance, it is possible to use various catalyst components which accelerate the conversion. As such catalyst components, an ionic compound or a compound capable of generating radical can be exemplified. As the ionic compounds, for example, sodium salt of thiophenols, alkali metal salt of sulfur can be exemplified, and as compounds capable of generating radical, for example, compounds capable of generating sulfur radical can be exemplified, more concretely, compounds having disulfide bond can be exemplified. However, even in such a case, it is preferable that the alkali metal content, the kind of alkali metal and the kind of halogen contained in the polyarylene sulfide prepolymer are in accordance with the above-mentioned conditions, and, it is preferable that the reaction in which the polyarylene sulfide prepolymer is heated to be converted into the high polymer is carried out in a condition in which the amount of alkali metal in the reaction system is 100 ppm or less, preferably 50 ppm or less, more preferably 30 ppm or less further preferably 10 ppm or less and further, the weight of disulfide with respect to the whole sulfur weight in the reaction system is less than 1 wt %, preferably less than 0.5 wt %, more preferably less than 0.3 wt % and further preferably less than 0.1 wt %, and by that, it becomes easy to obtain the PAS. In the case where various catalyst components are used, the catalyst component is usually taken into the PAS, and the obtained PAS may contain the catalyst component. In particular, when an ionic compound containing an alkali metal and/or other metal component is used as the catalyst component, most of the metal component contained therein may remain in the PAS obtained. As to the polyarylene sulfide obtained by using the various catalyst component, the above-mentioned weight loss when the PAS is heated is apt to increase. Accordingly, in case where a PAS of a higher purity is desired and/or a PAS of which weight loss when heated is small is desired, it is desired that the use the catalyst component is as small as possible or, preferably, no catalyst is used.

As a method for obtaining the above-mentioned polyarylene sulfide prepolymer, for example, the following methods are mentioned:

(1) A method of obtaining a polyarylene sulfide prepolymer by heating a mixture containing at least a polyhalogenated aromatic compound, a sulfidizing agent and an organic polar solvent to polymerize a polyarylene sulfide resin, and a mixture containing a granular PAS resin separable by 80 mesh sieve (opening 0.125 mm), a PAS component, other than the above-mentioned granular PAS resin, which is produced by the polymerization (referred to as polyarylene sulfide oligomer), organic polar solvent, water and halogenated alkali metal salt is prepared, and the polyarylene sulfide oligomer contained here is separated and collected and this is subjected to a purification.

(2) A method of collecting polyarylene sulfide prepolymer by heating a mixture containing at least a polyhalogenated aromatic compound, a sulfidizing agent and an organic polar solvent to polymerize a polyarylene sulfide resin, and the organic polar solvent is removed by a known method after finishing the polymerization and a mixture containing polyarylene sulfide resin, water and halogenated alkali metal salt is prepared, and obtain a polyarylene sulfide resin containing a polyarylene sulfide prepolymer by purifying the mixture by a known method, and this is extracted by a solvent which does not substantially dissolve the polyarylene sulfide resin but dissolve the polyarylene sulfide prepolymer.

Conversion of Polyarylene Sulfide Prepolymer to Highly Polymerized Substance

It is preferable that the above-mentioned PAS is produced by a method in which the above-mentioned polyarylene sulfide prepolymer is heated to be converted to a highly polymerized substance. It is preferable that the heating temperature is a temperature at which the above-mentioned polyarylene sulfide prepolymer is dissolved or melted and there is especially no problem if it is such a temperature condition. When the heating temperature is lower than the dissolving or melting temperature of the polyarylene sulfide prepolymer, it may need a long time to obtain PAS. Since the temperature at which the polyarylene sulfide prepolymer dissolves or melts varies by the composition or molecular weight of the polyarylene sulfide prepolymer or the environment when heated, it cannot be shown in one meaning, but for example, it is possible to know the dissolving or melting temperature by analyzing the polyarylene sulfide prepolymer by a differential scanning calorimeter. However, when the temperature is too high, between polyarylene sulfide prepolymers, between PASs produced by the heating, and between PAS and polyarylene sulfide prepolymer, or the like, undesirable side-reactions such as represented by a cross-linking reaction or a decomposition reaction may occur, and characteristics of the obtained PAS may deteriorate, and it is preferable to avoid a temperature at which such undesirable side reactions occur significantly. As the heating temperature, 180 to 400° C. can be exemplified, and it is preferably 200 to 380° C. and more preferably 250 to 360° C.

The time of the above-mentioned heating cannot be decided by one standard since it is different according to various characteristics of the polyarylene sulfide prepolymer used such as containing amount of the cyclic polyarylene sulfide, m or molecular weight, or heating temperature, etc., but it is preferable to determine so that the above-mentioned undesirable side reactions would not occur, if possible. As the heating time, 0.05 to 100 hours can be exemplified and 0.1 to 20 hours is preferable and 0.1 to 10 hours is more preferable. If it is less than 0.05 hours, conversion of the polyarylene sulfide prepolymer to PAS may become insufficient and if it exceeds 100 hours, not only possibility of appearing bad influences on characteristics of the obtained PAS due to the undesirable side reactions may increase but also an economical disadvantage may arise.

The conversion by heating of the polyarylene sulfide prepolymer to a highly polymerized substance is, usually, carried out in the absence of solvent, but it is possible to carry out in the presence of solvent. As the solvent, it is not especially limited as far as it does not spoil conversion by heating of the polyarylene sulfide prepolymer to a highly polymerized substance or it substantially does not cause undesirable side reactions such as decomposition or cross-linking of PAS, and for example, nitrogen containing polar solvents such as N-methyl-2-pyrrolidone, dimethyl formamide or dimethyl acetamide, sulfoxide-sulfone-based solvents such as dimethyl sulfoxide or dimethyl sulfone, ketone-based solvents such as acetone, methyl ethyl ketone, diethyl ketone or acetophenone, ether-based solvents such as dimethyl ether, dipropyl ether, tetrahydrofuran, halogen-based solvents such as chloroform, methylene chloride, trichloroethylene, dichloroethylene, dichloroethane, tetrachloroethane or chlorobenzene, alcohol-phenol-based solvents such as methanol, ethanol, propanol, butanol, pentanol, ethylene glycol, propylene glycol, phenol, cresol or polyethylene glycol, aromatic hydrocarbon-based solvents such as benzene, toluene or xylene, etc., are mentioned. Inorganic compounds such as carbon dioxide, nitrogen or water can be used as solvent in a supercritical fluid condition. These solvents can be used singly or as a mixture of 2 kinds or more.

The above-mentioned conversion by heating of the polyarylene sulfide prepolymer to a highly polymerized substance may be, as a matter of course, carried out in a way in which an ordinary polymerization reaction apparatuses used, and it may also be carried out in a mold in which a molded article is produced, and it can be carried out without specific limitations as far as by an apparatus equipped with a heating mechanism therein such as by an extruder or melt/mixing machine, and known method such as of a batch system or of a continuous system can be employed.

Regarding the atmosphere when the polyarylene sulfide prepolymer is converted to a highly polymerized substance, it is preferable to carry out in a non-oxidizing atmosphere and it is also preferable to carry out under a reduced pressure condition. In the case where it is carried out under a reduced pressure condition, it is preferable that the atmosphere in the reaction system is once turned to a non-oxidizing atmosphere and then it is turned to a reduced pressure condition. By that, undesirable side reactions such as cross-linking reaction or decomposition reaction between polyarylene sulfide prepolymers, between PASs produced by the heating, and between PAS and polyarylene sulfide prepolymer, etc., may be suppressed. The non-oxidizing atmosphere means that the oxygen concentration in gas phase which contacts with the polyarylene sulfide prepolymer is 5 vol % or less, preferably 2 vol % or less, further preferably, an atmosphere which substantially does not contain oxygen, that is, an inert gas atmosphere such as of nitrogen, helium or argon, and among them, from the view point of, especially, economy and easiness of handling, nitrogen atmosphere is preferable. "Under a reduced pressure condition" means that the inside of the reaction system is lower than the atmospheric pressure, and as the upper limit, 50 kPa or less is preferable, 20 kPa or less is more preferable and 10 kPa or less is further preferable. As the lower limit, 0.1 kPa or more can be exemplified and 0.2 kPa or more is more preferable. In case where the pressure reducing condition exceeds the preferable upper limit, undesirable side reactions such as cross-linking reaction may occur, and on the other hand, when it is less than the preferable lower limit, depending on reaction temperature, low molecular weight cyclic polyarylene sulfide contained in the polyarylene sulfide prepolymer may vaporize.

It is possible to carry out the above-mentioned conversion of polyarylene sulfide prepolymer to a highly polymerized substance under coexistence of a fibrous material. The fibrous material is a fine fiber-like material and it preferably is an arbitrarily selected one having a finely drawn structure as that of natural fiber. It is possible to easily prepare a composite material structure comprising PAS and a fibrous material by the conversion of polyarylene sulfide prepolymer to a highly polymerized substance in the presence of fibrous material. Such structural may be excellent, compared to a case of PAS only, for example, in mechanical characteristics, since it is reinforced by the fibrous material.

Among various fibrous materials, it is preferable to use a reinforcing fiber comprising a long fiber, and by that, it becomes possible to highly reinforcing the PAS. In general, when a composite material structure comprising a resin and a fibrous material is prepared, because of a high viscosity of the resin when melted, wetting of the fibrous material with the resin may worsen, and a uniform composite material may not be produced, or expected mechanical properties may not be exhibited. The wetting means that there is a good and maintained contact between a fluid material such as a melted resin and a solid base such as a fibrous compound such that air or other gas is not captured between the fluid material and the solid base. As the viscosity of the fluid material decreases, wetting with the fibrous material may become better. Because the viscosity when melted of the polyarylene sulfide prepolymer is very low compared to that of ordinary thermoplastic resins, for example, that of PAS, its wetting with the fibrous material may be good. According to the production method of PAS, since the polyarylene sulfide prepolymer is converted to a highly polymerized substance after forming a good wetting between the polyarylene sulfide prepolymer and the fibrous material, it is possible to obtain a composite material structure in which the fibrous material and the highly polymerized substance (polyarylene sulfide) formed a good wetting.

As mentioned above, a reinforcing fiber comprising a long fiber is preferable as the fibrous material and the reinforcing fiber is not especially limited, but, as a reinforcing fiber preferably used, heat resistant and high tensile strength fibers generally used as high performance reinforcing fiber, are mentioned. For example, as the reinforcing fibers, glass fiber, carbon fiber, graphite fiber, aramid fiber, silicon carbide fiber, alumina fiber and boron fiber are mentioned. Among them, carbon fiber or graphite fiber which is excellent in specific strength and specific modulus and contributes greatly to weight reduction can be exemplified as the best materials. Regarding the carbon fiber or graphite fiber, although it is possible to use all kinds of carbon fiber or graphite fiber depending on its use, a high strength and high elongation carbon fiber of a tensile strength 450 Kgf/mm$^2$ and tensile elongation 1.6% or more is most suitable. In the case where a long fiber state reinforcing fiber is used, it is preferable that the length is 5 cm or more. In this range of length, it becomes easy to sufficiently exhibit the reinforcing fiber strength in composite materials. The carbon fiber or graphite fiber may be used by mixing with other reinforcing fibers. The reinforcing fiber is not limited in its shape and arrangement, for example, it is possible to use even in unidirectional, random directional, sheet-shaped, mat-shaped, woven fabric-shaped or braid-shaped. In particular, for applications in which a high specific strength and a high specific modulus are required, an arrangement in which reinforcing fibers are unidirectionally paralleled is most suitable, but a cloth-shaped (woven fabric) arrangement of which handling is easy is also suitable.

Furthermore, it is also possible that the above-mentioned conversion of polyarylene sulfide prepolymer to a highly polymerized substance is carried out in the presence of filler. As the fillers, for example, non-fibrous glass, non-fibrous carbon or inorganic filler, i.e., calcium carbonate, titanium oxide, alumina, etc., can be exemplified.

(3) Characteristics of PAS

The PAS is excellent in heat resistance, chemical resistance, flame resistance, electric properties and mechanical properties, in particular, compared to conventional PAS, molecular weight distribution is narrow and metal content is significantly low, and molding processability, mechanical characteristics and electrical characteristics are extremely excellent, and therefore, not only by injection molding, injection press molding or blow molding, but also by extrusion molding, can be molded and used as into extrusion molding articles such as a sheet, a film, a fiber or a pipe.

As production methods of PAS film in which the PAS is used, known melt film forming methods can be employed, for example, a method in which, after melting the PAS in a single screw or twin screw extruder, it is extruded from a film die and cooled on a cooling drum to prepare a film, or, a biaxial stretching method in which thus obtained film is biaxially stretched by a roller type longitudinal stretching machine and a transverse stretching machine which is called as tenter, etc., can be exemplified, but they are not especially limited thereto.

As production methods of PAS fiber in which the PAS is used, known melt spinning methods can be employed, but for example, a method in which, the PAS chip, which is raw material, is mixed while feeding to a single screw or twin screw extruder, subsequently it is extruded from a spinneret via a polymer flow line changer, filtering layer, etc. equipped with at the end of the extruder, cooled, stretched and subjected to a heat set, etc., can be employed, but it is not especially limited thereto.

Furthermore, the PAS may be used alone, or, as desired, inorganic fillers such as glass fiber, carbon fiber, titanium oxide, calcium carbonate, an antioxidant, a heat stabilizer, a UV absorber, a colorant, etc., can be added, and resins such as a polyamide, a polysulfone, polyphenylene ether, polycarbonate, a polyether sulfone, a polyester represented by polyethylene terephthalate or polybutylene terephthalate, polyethylene, polypropylene, polytetrafluoroethylene, an olefin-based copolymer having functional group such as epoxy group, carboxyl group, a carboxylic acid ester group, an acid anhydride group, a polyolefin-based elastomer, a polyether ester elastomer, a polyether amide elastomer, a polyamide imide, a polyacetal or polyimide, can be compounded.

(4) Use of PAS

Since the characteristics of the PAS is excellent in molding processability, mechanical characteristics and electrical characteristics, as its uses, for example, electric electronic parts such as represented by a sensor, a LED lamp, a connector, a socket, a resistor, a relay case, a switch, a coil bobbin, a condenser, a variable condenser case, a light pick-up, an oscillator, various terminal plates, a transformer, a plug, a print wiring board, a tuner, a speaker, a microphone, a headphone, a micro-motor, a magnetic head base, a power module, a semiconductor, a liquid crystal, an FDD carriage, an FDD chassis, a motor brush holder, a parabolic antenna and computer related parts; home and office electric product parts such as represented by VTR parts, TV parts, an iron, a hair dryer, rice cooker parts, microwave oven parts, auto imaging device parts including audio parts, an audio laser disk (trademark), a compact disk, a digital video disk, illumination parts, refrigerator parts, air conditioner parts, type writer parts and word processor parts; machine-related parts such as office computer related parts, telephone related parts, facsimile relater parts, copy machine related parts, cleaning devices, motor parts, a lighter and a type writer: optical instrument and precision instrument-related parts including a microscope, binocular, a camera and a watch; water-related parts including a faucet corner, a water mixing valve, pump parts, a pipe joint, a water quantity control valve, a relief valve, a hot water temperature sensor, a water quantity sensor and a water meter housing; automobile vehicle-related parts such as various valves including a valve alternator terminal, an alternator connector, an IC regulator, a potentiometer base for light dimmer and exhaust gas valve, various pipes of fuel/exhaust/inspiration systems, an air intake nozzle snorkel, an intake manifold, a fuel pump, an engine cooling water joint, a carburetor main body, a carburetor spacer, an exhaust gas sensor, a cooling water sensor, an oil temperature sensor, a throttle position sensor, a crank shaft position sensor, an air flow meter, a brake pad abrasion sensor, a thermostat base of air conditioner, a warm air flow control valve for heating, a brush holder of radiator motor, a water pump impeller, a turbine vein, wiper motor-related parts, a distributor, a starter switch, a starter relay, a wire harness of transmission, a window washer nozzle, an air conditioner panel switch board, a coil of fuel-related electromagnetic valve, a connector for fuse, a horn terminal, an insulation plate for electrical parts, a step motor rotor, a lamp socket, a lamp reflector, a lamp housing, a brake piston, a solenoid bobbin, an engine oil filter, a fuel tank, an ignition device case, a speed sensor and a cable liner, and other various applications can be exemplified.

In the case of PAS film, it has excellent mechanical characteristics, electrical characteristics, heat resistance, and can be used for various uses such as dielectric film uses of a film condenser or a chip condenser, a circuit board, an insulating substrate use, a motor insulation film use, a transformer insulation film use or a releasing film use.

In the case of monofilament or short fiber of PAS, it can preferably be used for various uses such as a dryer canvas for paper making, a net conveyer, a bag filter or an insulating paper.

EXAMPLES

Hereafter, the polyarylenes and methods are explained concretely with reference to examples. These are exemplificative and not restrictive.

Measurement of Molecular Weight

Molecular weight of the polyarylene sulfide and polyarylene sulfide prepolymer were determined by gel permeation chromatography (GPC), which is a kind of size exclusion chromatography (SEC), as polystyrene equivalent.

Measurement conditions of GPC are shown in the following:
Instrument: Senshu Scientific Co. SSC-7100
Column: Senshu Scientific Co. GPC3506
Elute: 1-chloronaphthalene
Detector: differential refractive index detector
Column temperature: 210° C.
Pre-thermostat temperature: 250° C.
Pump thermostat temperature: 50° C.
Detector temperature: 210° C.
Flow rate: 1.0 mL/min
Injection volume of sample: 300 µL (slurry state, approximately 0.2 wt %)

Quantitative Analysis of Alkali Metal Content

Quantitative analysis of the alkali metal content contained in the polyarylene sulfide and the polyarylene sulfide prepolymer was carried out by the following way:
(a) Sample was taken by a balance and put into a quartz crucible to be incinerated by an electric furnace.
(b) The incineration ash was dissolved by concentrated nitric acid and then diluted to a constant volume by diluted nitric acid.
(c) The obtained constant volume liquid was subjected to ICP gravimetric analysis (Instrument; 4500 of Agilent) and ICP emission spectroscopy (Instrument; Optima 4300DV of PerkinElmer).

Quantitative Analysis of Halogen Content

Quantitative analysis of the amount of halogen contained in the polyarylene sulfide and polyarylene sulfide prepolymer was carried out by the following way:
(a) Sample was burned in a flask filled with oxygen.
(b) The burned gas was absorbed by a solution to prepare an absorbed liquid.
(c) Halogen concentration was quantitatively analyzed by analyzing a part of the absorbed liquid by ion chromatography (Instrument; DX320 of Dionex Co.).

Measurement of Weight Loss Ratio of PAS When Heated

The weight loss ratio of polyarylene sulfide when heated was measured by using a thermogravimetric analyzer in the following conditions. Wherein, as the sample, fine particles of 2 mm or less were used:
Instrument: TGA7 of Perkin Elmer Co.
Measuring atmosphere: under nitrogen flow
Sample weight used: approximately 10 mg
Measuring conditions:
(a) Maintained at a program temperature of 50° C. for 1 minute.
(b) Temperature was raised from the program temperature 50° C. up to 400° C. The heating rate at this time was 20° C./min.

The weight loss ratio, $\Delta Wr$, was calculated by using the above-mentioned equation (1) from the sample weight when arrived at 330° C. with respect to the sample weight at 100° C. in the heating step (b).

In the following examples, a weight loss ratio at 300° C. in heating step with respect to the sample weight at 100° C. was expressed as $\Delta Wr300$, a weight loss ratio at 320° C. in heating step with respect to the sample weight at 100° C. was expressed as $\Delta Wr320$ and a weight loss ratio at 340° C. in heating step with respect to the sample weight at 100° C. was expressed as $\Delta Wr340$, and they were shown as references.

Analysis of Generated Gas Component of PAS When Heated

The quantitative analysis of the generated component when PAS is heated was carried out in the following way. Fine particles of 2 mm or less were used as the sample.
(a) Collection of gas generated when heated
Approximately 10 mg of PAS was heated under nitrogen flow (50 ml/min) at 320° C. for 60 minutes, and gas component generated was collected by an air sampling and heat releasing tube, Carbotrap 400.
(b) Analysis of gaseous component
Gas component collected in the above-mentioned tube was heat released by raising temperature from room temperature to 280° C. in 5 minutes by using a heat releasing instrument TDU (of Supelco Co.). The heat released component was fractioned into respective components by using a gas chromatography to thereby carry out a quantitative analysis of γ-butyrolactone and 4-chloro-N-methyl aniline in the gas.

Reference Example 1

Preparation 1 of Polyarylene Sulfide Prepolymer

To a 70 liter autoclave equipped with a stirrer, 47.5% sodium hydrosulfide 8.27 kg (70.0 mol), 96% sodium hydroxide 2.96 kg (71.0 mol), N-methyl-2-pyrrolidone (hereafter, may be abbreviated as NMP) 11.44 kg (116 mol), sodium acetate 1.72 kg (21.0 mol) and deionized water 10.5 kg were fed, gradually heated up to approximately 240° C. in approximately 3 hours while feeding nitrogen under normal pressure, and after water 14.8 kg and NMP 280 g were distilled out via a distillation column, the reaction container was cooled to 160° C. During this liquid removing operation, 0.02 mol hydrogen sulfide per 1 mol sulfur component fed was diffused outside of the reaction system.

Next, p-dichlorobenzene 10.3 kg (70.3 mol) and NMP 9.00 kg (91.0 mol) were added, and the reaction container was sealed under nitrogen gas. While being stirred at 240 rpm, it was heated up to 270° C. at a rate of 0.6° C./min, and maintained at this temperature for 140 minutes. While press feeding water 1.26 kg (70 mol) in 15 minutes, cooled to 250° C. at a rate of 1.3° C./min. After that, it was cooled to 220° C. at a rate of 0.4° C./min and rapidly cooled to around room temperature, and obtained Slurry (A). This Slurry (A) was diluted with 26.3 kg NMP to obtain Slurry (B).

Slurry (B) 1000 g heated to 80° C. was filtered by a sieve (80 mesh, opening 0.175 mm) to obtain a raw PPS resin and Slurry (C) of approximately 750 g. Slurry (C) were put into a rotary evaporator and its inside was replaced with nitrogen, and after treating under reduced pressure at 100 to 160° C. for 1.5 hours, it was treated by a vacuum drier at 160° C. for 1 hour. NMP content was 3% in the obtained solid substance.

To this solid substance, after deionized water 900 g (1.2 times amount of Slurry (C)) was added and a slurry was made again by stirring at 70° C. for 30 minutes. This slurry was suction filtered by a glass filter of its opening was 10 to 16 μm. To the obtained white cake, deionized water 900 g was added and stirred at 70° C. for 30 minutes to obtain a slurry again, and after it was suction filtered in the same way, vacuum dried at 70° C. for 5 hours to obtain a polyphenylene sulfide oligomer.

4 g was separated from the obtained polyphenylene sulfide oligomer and was extracted with chloroform 120 g for 3 hours by a soxlet. To a solid obtained by distilling out the chloroform from the obtained extract, chloroform 20 g was added again and it was dissolved at room temperature to obtain a mixed liquid in a slurry state. This is slowly dropped into methanol 250 g while stirring, precipitate was suction filtered by a glass filter of which opening was 10 to 16 μm, and the obtained white cake was vacuum dried at 70° C. for 3 hours to obtain a white powder.

Weight average molecular weight of this white powder was 900, Na content was 4 ppm, chlorine content was 2.2 wt % and alkali metal other than Na and halogen other than chlorine were detectable limit or less. It was found that the white powder was polyphenylene sulfide from an absorption spectrum of infrared spectroscopic analysis of this white powder. As a result of an analysis of thermal characteristics of this white powder by using a differential scanning calorimeter (heating rate 40° C./min), it was found that it shows a broad absorption at around 200 to 260° C. and the peak temperature was approximately 215° C.

Furthermore, from a mass spectrum analysis of a component fractioned by a high speed liquid chromatography, and further, from a molecular weight information by MALDI-TOF-MS, it was found that this white powder is a mixture consisting of cyclic polyphenylene sulfides of which number of repeating unit 4 to 11 and linear polyphenylene sulfides of which number of repeating units 2 to 11, and a weight ratio of the cyclic polyphenylene sulfide and the linear polyphenylene sulfide was approximately 9:1. By this, it was found that the obtained white powder contained cyclic polyphenylene sulfide by approximately 90 wt % and linear polyphenylene sulfide by approximately 10%, and it was a polyphenylene sulfide prepolymer which can be preferably used for producing the PAS. Where, as a result of GPC measurement, the polyphenylene sulfide prepolymer was completely soluble in 1-chloronaphthalene and its weight average molecular weight was 900.

Reference Example 2

Preparation 1 of Polyphenylene Sulfide by Conventional Technology

To the raw PPS resin 160 g obtained in Reference example 1, NMP approximately 0.25 liter was added and washed at 85° C. for 30 minutes, and filtered by a sieve (80 mesh, opening 0.175 mm). An operation in which the obtained solid substance was diluted with 0.5 liter deionized water, and after stirring at 70° C. for 30 minutes, filtered by 80 mesh sieve to collect the solid substance was repeated 5 times in total. Thus obtained solid substance was hot-air dried at 130° C. to obtain a dried polymer. Absorption spectrum by infrared spectroscopic analysis of the obtained polymer agreed with the absorption of the polyphenylene sulfide prepolymer obtained in Reference example 1.

Reference Example 3

Preparation 2 of Polyphenylene Sulfide by Conventional Technology

To the raw PPS resin 100 g obtained in Reference example 1, NMP approximately 0.25 liter was added and washed at 85° C. for 30 minutes, and filtered by a sieve (80 mesh, opening 0.175 mm). An operation in which the obtained solid substance was diluted with 0.5 liter deionized water, and after stirring at 70° C. for 30 minutes, filtered by 80 mesh sieve to collect the solid substance was repeated 3 times in total. Next, the obtained solid substance was diluted with 0.5 liter deionized water to make it a slurry, and acetic acid 0.24 g was added thereto to make the slurry acidic and stirred at 70° C. for 30 minutes and filtered by 80 mesh sieve. The obtained solid substance was diluted again with 0.5 liter deionized water, and after stirring at 70° C. for 30 minutes, washed, filtered by 80 mesh sieve. Thus obtained solid substance was hot-air dried at 130° C. to obtain a dried polymer.

Reference Example 4

Preparation 2 of Polyphenylene Sulfide Mixture

To a 5 liter autoclave equipped with a stirrer, sodium sulfide 9-hydrate 60 g (0.25 mol), 96% sodium hydroxide 0.52 g (0.0125 mol), NMP 2.56 kg (25.9 mol) and p-dichlorobenzene 37.7 g (0.255 mol) were fed and the reaction container was sealed under nitrogen.

While being stirred at 240 rpm, after it was heated up to 200° C. in an approximately 2 hours, heated up to 220° C. at a rate of 1.0° C./min, and maintained at this temperature for 10 hours. After that, it was cooled to around room temperature, and obtained Slurry (D). This Slurry (D) 1 kg was diluted with 4 kg deionized water, and after stirred at 70° C. for 30 minutes, it was filtered by a glass filter of which average pore size was 10 to 16 μm. The obtained solid component was dispersed in deionized water 1 kg and after stirring at 70° C. for 30 minutes, filtered in the same way. Subsequently, the solid component was dispersed in 0.5% aqueous acetic acid solution 1 kg and after stirred at 70° C. for 30 minutes, filtered in the same way. The obtained solid component was again dispersed in deionized water 1 kg and after stirred at 70° C. for 30 minutes, filtered in the same way. The obtained water-containing cake was dried by a vacuum drier for a night at 70° C. to thereby obtain dried cake 7.4 g.

5 g was separated from thus obtained dried cake and was extracted with tetrahydrofuran 150 g for 3 hours by a soxlet. The tetrahydrofuran was distilled out from the obtained extract. To thus obtained solid, acetone 150 g was added and after stirred, it was suction filtered by a glass filter of which opening was 10 to 16 μm to thereby obtain a white cake. This was vacuum dried at 70° C. for 3 hours to obtain a white powder. From an absorption spectrum by an infrared spectroscopic analysis of this white powder, it was found that the white powder was polyphenylene sulfide.

From a result of a high speed liquid chromatography analysis of the obtained white powder, it was found that this white powder was a mixture consisting of cyclic polyphenylene sulfide and linear polyphenylene sulfide, and a weight ratio of cyclic polyphenylene sulfide and linear polyphenylene sulfide was approximately 1:1.5 (cyclic PPS weight/linear PPS weight=0.67). From the result of these analyses, it was found that the obtained white powder is a polyphenylene sulfide mixture containing cyclic polyphenylene sulfide by approximately 40 wt % and linear polyphenylene sulfide by approximately 60%. As a result of a GPC measurement, a weight average molecular weight of the polyphenylene sulfide mixture was 1500.

Example 1

The polyarylene sulfide prepolymer obtained in Reference example 1, 100 mg was put into a glass ampoule, inside of the ampoule was replaced with nitrogen. The ampoule was placed in an electric furnace of which temperature was adjusted to 300° C., and after heated for 60 minutes, the ampoule was taken out and cooled to room temperature. Infrared spectrum of the obtained slightly brackish product agreed with Reference example 2, and it was found that the product was PPS. The product was completely soluble in 1-chloronaphthalene at 210° C. As a result of GPC measurement, a peak based on PAS prepolymer and a peak based on the produced polymer (PPS) could be confirmed and it was found that a degree of conversion of the prepolymer to PPS was 71%, weight average molecular weight of the obtained PPS was 61,700 and the polydispersity was 1.94. As a result of an elementary analysis of the obtained product, Na content was 4 ppm and other alkali metal than that was not detected. In addition, other halogen than chlorine was not detected. As a result of measurement of the weight loss ratio of the obtained product when heated, $\Delta Wr$, was 0.075%. In addition, $\Delta Wr300(\%)=0.043$, $\Delta Wr320(\%)=0.061$ and $\Delta Wr340(\%)=0.092$.

A result of measurement of molecular weight of the PPS separated from the above-mentioned obtained product is shown below. To approximately 50 mg of the above-mentioned obtained product, approximately 5 g of 1-chloronaphthalene was added, and after stirred at 250° C. for 10 minutes, cooled to room temperature to obtain a slurry. This slurry was filtered by using a filter paper (5C) of average opening 1 μm and obtained a cake containing 1-chloronaphthalene. After adding chloroform of approximately 30 g to this cake, a dispersion liquid was obtained by an ultrasonic cleaner. This fluid dispersion is filtered as described previously to produce cake containing chloroform. To this cake, after methanol of approximately 20 g was added, and after obtaining a dispersion liquid by ultrasonic cleaner, filtration was performed as described previously, and the cake was rinsed by methanol of approximately 20 g. Thus obtained cake containing methanol was vacuum dried at 70° C. for 3 hours. As a result of a GPC measurement of the obtained white solid, the peak based on PAS prepolymer confirmed in GPC measurement of the above-mentioned product was disappeared, and only the peak of polymer appeared.

Example 2

PAS was synthesized in the same way as Example 1 except changing the heating temperature in the electric furnace to 340° C. The obtained product was slightly brackish one. Its infrared spectrum agreed with Reference example 2, and it was found that the product was PPS. When this product was dissolved in 1-chloronaphthalene at 210° C., a small amount of insoluble component was found. As a result of GPC measurement of soluble component, a degree of conversion of the prepolymer to PPS was 99%, a weight average molecular weight of the obtained PPS was 67,300 and a polydispersity was 2.15. As a result of elementary analysis of the obtained product, Na content was 3 ppm and other alkali metal than that was not detected. Other halogen than chlorine was not detected. As a result of measurement of the weight loss ratio of the obtained product when heated, $\Delta Wr$, was 0.071%. In addition, $\Delta Wr300(\%)=0.045$, $\Delta Wr320(\%)=0.060$ and $\Delta Wr340(\%)=0.084$.

Furthermore, as a result of carrying out an analysis of generated gas component of the PPS obtained here when heated, a lactone type compound and an aniline type compound were detectable limit or less.

Example 3

The polyarylene sulfide prepolymer obtained in Reference example 1, 100 mg was put in a glass ampoule and after its inside was replaced with nitrogen, reduced to approximately 0.2 kPa by using a vacuum pump. The ampoule was placed in an electric furnace adjusted to 300° C., and after it was heated for 60 minutes while maintaining inside of the ampoule approximately 0.2 kPa, the ampoule was taken out and cooled to room temperature. A small amount of diffusion component was found during the heating.

The obtained product was a slightly brownish resin. An infrared spectrum of this product agreed with Reference example 2, and it was found that the product was PPS. The product was completely soluble in 1-chloronaphthalene at 210° C. As a result of GPC measurement, it was found that a degree of conversion of the prepolymer to PPS was 20%, a weight average molecular weight of the obtained PPS was 38,300 and a polydispersity was 1.47. As a result of elementary analysis of the obtained product, Na content was 4 ppm and other alkali metal than that was not detected. Other halogen than chlorine was not detected. As a result of measurement of the weight loss ratio of the obtained product when heated, $\Delta Wr$, was 0.106%. In addition, $\Delta Wr300(\%)=0.082$, $\Delta Wr320(\%)=0.096$ and $\Delta Wr340(\%)=0.118$.

A separation of PPS from the above-mentioned product was carried out in the same way as Example 1, and it was confirmed that PPS can be isolated as well as Example 1.

Example 4

The same operations as Example 3 were carried out except changing the heating time in the electric furnace to 120 minutes, and obtained a slightly brownish resinous product. An infrared spectrum of this product agreed with Reference example 2, and it was found that the product was PPS. The product was completely soluble in 1-chloronaphthalene at 210° C. As a result of GPC measurement, it was found that a degree of conversion of the prepolymer to PPS was 56%, weight average molecular weight of the obtained PPS was 63,800, and polydispersity was 1.70. As a result of elementary analysis of the obtained product, Na content was 4 ppm and other alkali metal than that was not detected. In addition, other halogen than chlorine was not detected. As a result of measurement of the weight loss ratio of the obtained product when heated, $\Delta Wr$, was 0.031%. In addition, $\Delta Wr300(\%)=0.014$, $\Delta Wr320(\%)=0.025$ and $\Delta Wr340(\%)=0.040$.

Example 5

The same operations were carried out as Example 3 except changing the heating temperature in electric furnace to 340° C., and obtained a slightly brownish resinous product. An infrared spectrum of this product agrees with Reference example 2, and it was found that the product was PPS. The product was completely soluble in 1-chloronaphthalene at 210° C. As a result of GPC measurement, it was found that a degree of conversion of the prepolymer to PPS was 86%, a weight average molecular weight of the obtained PPS was 72,800 and a polydispersity was 1.88. As a result of elementary analysis of the obtained product, Na content was 3 ppm and other alkali metal than that was not detected. In addition, other halogen than chlorine was not detected. As a result of measurement of the weight loss ratio of the obtained product when heated, $\Delta Wr$, was 0.042%. In addition, $\Delta Wr300(\%)=0.025$, $\Delta Wr320(\%)=0.034$ and $\Delta Wr340(\%)=0.049$.

Example 6

The same operations as Example 5 were carried out except changing the heating time in the electric furnace to 120 minutes, and obtained a slightly brownish resinous product. An infrared spectrum of this product agrees with Reference example 2, and it was found that the product was PPS. The product was completely soluble in 1-chloronaphthalene at 210° C. As a result of GPC measurement, it was found that a degree of conversion of the prepolymer to PPS was 93%, a weight average molecular weight of the obtained PPS was 130,300 and polydispersity was 2.03. As a result of elementary analysis of the obtained product, Na content was 3 ppm and other alkali metal than that was not detected. In addition, other halogen than chlorine was not detected. As a result of measurement of the weight loss ratio of the obtained product when heated, $\Delta Wr$, was 0.037%. In addition, $\Delta Wr300(\%)=0.022$, $\Delta Wr320(\%)=0.031$ and $\Delta Wr340(\%)=0.042$.

Furthermore, as to the PPS obtained here, as a result of carrying out an analysis of gas components generated when heated, a lactone type compound and an aniline type compound were detectable limit or less.

Comparative Example 1

As a result of GPC measurement of the PPS obtained in Reference example 2, it was found that a weight average molecular weight of the obtained PPS was 59,600 and polydispersity was 3.78. As a result of elementary analysis, Na content was 1,040 ppm and other alkali metal than that was not detected. In addition, other halogen than chlorine was not detected. As a result of measurement of the weight loss ratio of the obtained PPS when heated, $\Delta Wr$, was 0.229%. In addition, $\Delta Wr300(\%)=0.179$, $\Delta Wr320(\%)=0.210$ and $\Delta Wr340(\%)=0.244$.

Furthermore, as to the PPS obtained in Reference example 2, as a result of carrying out an analysis of the gas component generated when heated, with respect to the weight of PPS before heating, γ-butyrolactone 618 ppm and 4-chloro-N-methyl aniline 416 ppm were detected.

Comparative Example 2

As a result of GPC measurement of the PPS obtained in Reference example 3, there was no meaningful difference from Comparative example 1. As a result of elementary analysis, Na content was 170 ppm and other alkali metal than that was not detected. In addition, other halogen than chlorine was not detected. As a result of measurement of the weight loss ratio of the obtained PPS when heated, $\Delta Wr$, was 0.259%. In addition, $\Delta Wr300(\%)=0.223$, $\Delta Wr320(\%)=0.247$ and $\Delta Wr340(\%)=0.270$.

Furthermore, as to the PPS obtained in Reference example 2, as a result of carrying out an analysis of gas component generated when heated, with respect to the weight of PPS before heating, γ-butyrolactone 1,350 ppm and 4-chloro-N-methyl aniline 382 ppm were detected.

It can be seen from comparison of the PAS exemplified in Examples 1 to 6 and the PAS prepared by the known methods of Comparative examples 1 and 2, it was found that, in the PAS, the molecular weight distribution is very narrow, and the alkali metal content is very small. It is found that, in the PAS, the amount of lactone type compound and/or aniline type compound generated when heated is very small.

Comparative Example 3

A result of synthesis of PAS according to the production method of PAS disclosed in Patent reference 6, i.e., a method in which a cyclic arylene sulfide oligomer is subjected to a heating ring-opening polymerization by an ionic ring-opening polymerization catalyst, is explained.

The same operations as Example 1 were carried out except putting in a glass ampoule 100 mg of a powder, in which the polyarylene sulfide prepolymer obtained in Reference example 1 and sodium salt of thiophenol as an ionic catalyst compound were mixed in a weight ratio of 1:0.012. The obtained product was a blackish brittle block. An infrared spectrum of the product agreed with Reference example 2, and it was found that the product was PPS. The product was completely soluble in 1-chloronaphthalene at 210° C. As a result of GPC measurement, it was found that a degree of conversion of the prepolymer to PPS was 70%, a weight average molecular weight of the obtained PPS was 34,500 and a polydispersity was 1.74. As a result of elementary analysis of the obtained product, Na content was 2,050 ppm and other alkali metal than that was not detected. In addition, other halogen than chlorine was not detected.

It was found that, by the known method in which an ionic compound is used as a ring-opening polymerization catalyst in a ring-opening polymerization of cyclic polyarylene sulfide, a much amount of alkali metals contained in the obtained PAS.

Comparative Example 4

A result of synthesis of PAS according to the production method of PAS disclosed in U.S. Pat. No. 5,869,599, specification (pages 27 to 28), i.e., a production method of PAS in which a cyclic aromatic thioether oligomer is subjected to a ring-opening polymerization under presence of a polymerization initiator which generates a sulfur radical, is explained.

The same operations as Example 1 were carried out except putting in a glass ampoule 100 mg of a powder, in which the polyarylene sulfide prepolymer obtained in Reference example 1 and 2,2'-dithiobisbenzothiazole as a radical catalyst compound were mixed in a weight ratio of 1:0.031. The obtained product was a brackish brittle block. An infrared spectrum of the product agreed with Reference example 2, and it was found that the product was PPS. As a result of measurement, weight loss ratio of the obtained PPS when heated, $\Delta Wr$, was 0.282%. In addition, $\Delta Wr300(\%)=0.204$, $\Delta Wr320(\%)=0.252$ and $\Delta Wr340(\%)=0.313$.

It was found that, by the known method in which a radical catalyst compound is used as ring-opening polymerization catalyst at ring-opening polymerization of a cyclic polyarylene sulfide, a weight loss ratio of the obtained PAS when heated increases.

Comparative Example 5

A result of producing PAS according to the conventionally employed reducing method of weight loss ratio of PAS when heated, is explained. A PAS was produced, according to the method of JP 2000-246733 A (page 4), in the following way.

Slurry (B) obtained in Reference example 1, 41 kg was filtered by a sieve (80 mesh, opening 0.175 mm), NMP 18.4 kg was added to the obtained solid component and stirred at 85° C. for 30 minutes, and filtered by the same sieve as the above-mentioned. An operation for collecting solid substance in which the obtained solid substance was diluted with 32 kg deionized water, and after stirring at 70° C. for 30 minutes, filtered by the same sieve as the above-mentioned, was repeated 3 times in total. Subsequently, deionized water 40 kg and calcium acetate 20 g were added to the obtained solid and after stirring at 70° C. for 30 minutes, and a solid substance was collected by filtering by the same sieve as the above-mentioned. An operation for collecting a solid substance in which the obtained solid substance was diluted with 40 kg deionized water and after stirring at 70° C. for 30 minutes, filtered by the same sieve as the above-mentioned, was repeated 2 times in total. Thus obtained solid substance was hot-air dried at 130° C. to obtain an approximately 4 kg of PPS in a particle state.

The obtained PPS in particle state was molten and mixed by TEX30 model twin screw extruder produced by The Japan Steel Works, Ltd., at a cylinder temperature of 320° C. and screw rotations of 200 rpm. Hopper portion, vent portion and screw shaft portion were sealed with nitrogen to prevent an air entrainment. During the melting and mixing, the vent portion was reduced to a pressure of approximately 10 kPa to remove volatile components. A strand extruded from a nozzle was cooled by water and cut into a gut state and then pelletized by using a strand cutter. The obtained pellet was dried for a night at 130° C.

As a result of carrying out a measurement of weight loss ratio when heated of thus obtained PPS pellet, $\Delta Wr$, was 0.187%. $\Delta Wr300(\%)=0.139$, $\Delta Wr320(\%)=0.173$ and $\Delta Wr340(\%)=0.199$. As a result of elementary analysis of the obtained product, Na content was 120 ppm, Ca content was 550 ppm, and other alkali metal than sodium was not detected. In addition, other halogen than chlorine was not detected.

It was found that, in the PAS obtained by the conventionally employed method of reducing weight loss ratio of PAS when heated, compared to the PAS, $\Delta Wr$ is large.

Comparative Example 6

A result of synthesis of PAS according to the production method of PAS disclosed in POLYMER, Vol. 37, No. 14, 1996 (pages 3111 to 3116), i.e., a method in which the polyphenylene sulfide mixture obtained by Reference example 4 was used, is explained.

PAS was synthesized in the same way as Example 1 except using the white powder obtained in Reference example 4, i.e., the polyphenylene sulfide mixture containing approximately 40 wt % of cyclic polyphenylene sulfide was used.

The obtained product was a brackish brittle block. An infrared spectrum of the product substantially agreed with Reference example 2, and it was found that the product was PPS. The product was completely soluble in 1-chloronaphthalene at 210° C., but the solution was colored brown. As a result of GPC measurement, the degree of conversion of the raw material to the polymer was 83%, the weight average molecular weight of the obtained PPS was 3,200, the polydispersity was 2.13, and a PAS having a sufficiently high molecular weight could not be obtained.

Comparative Example 7

A result of synthesis of PAS according to the production method of PAS disclosed in POLYMER, Vol. 37, No. 14, 1996 (pages 3111 to 3116), i.e., synthesis of PAS from the polyphenylene sulfide mixture obtained by the method of Reference example 4, was carried out except changing the temperature condition from that of Comparative example 6, is explained.

PAS was synthesized in the same way as Example 2 except using the white powder obtained in Reference example 4, i.e., a PPS mixture containing approximately 40 wt % of cyclic PPS and approximately 60% of linear PPS.

The obtained product was a brackish brittle block, and partially foamed. An infrared spectrum of the product substantially agreed with Reference example 2, and it was found that the product was PPS. The product was partially insoluble in 1-chloronaphthalene at 210° C., and the solution was colored brown. As a result of GPC measurement, the degree of conversion of the raw material to the polymer was 97%, the weight average molecular weight of the obtained PPS was 4,500, polydispersity was 2.25, and a PAS having a sufficiently high molecular weight could not be obtained.

Example 7

An example, in which a PAS was produced from a polyarylene sulfide prepolymer under presence of a fibrous material, is explained.

At center portion of a glass cloth (width 50 mm×length approximately 70 mm×thickness 0.2 mm, weight approximately 1.0 g, twill weave), approximately 0.5 g of the polyarylene sulfide prepolymer obtained in Reference example 1 was placed in circular state of a diameter of approximately 2 cm. This is sandwiched with aluminum foils and heat press molded by using a press molding machine at 360° C. for 30 minutes and at a pressure of 50 kg/cm², and then cooled to around room temperature.

When the aluminum foils were removed, it was found to be in a state that the resin impregnated to all over the glass cloth. The resin was taken out from the obtained composite of the glass cloth and the resin, and subjected to a GPC measurement, and it was found that the degree of conversion of the polyarylene sulfide prepolymer to the polymer was 93%, the weight average molecular weight was 63,100 and the polydispersity was 2.27. It was found that PAS can be produced under a presence of fibrous material and a uniform composite material can be easily obtained.

Comparative Example 8

At center portion of a glass cloth (width 50 mm×length approximately 70 mm×thickness 0.2 mm, weight approximately 1.0 g, twill weave), approximately 0.5 g PPS obtained in Reference example 2 was placed in circular state of a diameter of approximately 2 cm. This was sandwiched with aluminum foils and heat press molded in the same way as Example 7, and then cooled to around room temperature.

When the aluminum foils were removed, the resin was present only around the center portion, and had not impregnated to edge portions. It was found that, in case where PPS was used, a uniform composite with a fibrous material could not be obtained.

The invention claimed is:

1. A polyarylene sulfide having a weight average molecular weight of 10,000 or more, a polydispersity expressed as weight average molecular weight/number average molecular weight is 2.5 or less, weight loss when heated that satisfies the following equation:

$$\Delta Wr=(W1-W2)/W1\times100\leq0.18(\%)$$

(where $\Delta Wr$ is a weight loss ratio (%) and is determined from a sample weight (W2) at 330° C. and a sample weight (W1) at 100° C., when a thermogravimetric analysis is carried out from 50° C. to a predetermined temperature of 330° C. or more at a heating rate of 20° C/min in non-oxidizing atmosphere under ambient pressure) wherein the alkali metal content is 100 ppm or less.

2. The polyarylene sulfide according to claim 1, wherein an alkali metal content is less than 50 ppm.

3. The polyarylene sulfide according to claim 1, wherein the alkali metal is substantially sodium.

4. The polyarylene sulfide according to claim 1, which substantially does not contain a halide other than chloride.

5. The polyarylene sulfide according to claim 1, wherein a compound having a lactone structure in generated gas component when heated is 500 ppm or less with respect to the polyarylene sulfide weight.

6. The polyarylene sulfide according to claim 1, wherein a compound having an aniline structure in generated gas component when heated is 300 ppm or less with respect to the polyarylene sulfide weight.

7. The polyarylene sulfide according to claim 1, wherein a compound having a lactone structure in generated gas component when heated is 500 ppm or less with respect to polyarylene sulfide weight and a compound having an aniline structure in generated gas component when heated is 300 ppm or less with respect to the polyarylene sulfide weight.

8. A method of producing polyarylene sulfide comprising:
providing a polyarylene sulfide prepolymer having a weight average molecular weight less than 10,000 and which contains at least 50 wt % or more of a cyclic polyarylene sulfide; and
heating the prepolymer in the absence of a catalyst to be converted to a polymer of which weight average molecular weight is 10,000 or more.

9. The method according to claim 8, further comprising during heating, controlling an amount of alkali metal to 100 ppm or less and a weight of disulfide with respect to total sulfur weight to less than 1 wt %.

10. The method according to claim 8, wherein the heating is carried out in a non-oxidizing atmosphere.

11. The method according to claim 8, wherein the heating is carried out under reduced pressure condition.

12. The method according to claim 8, wherein the polyarylene sulfide prepolymer is in a molten state during heating.

13. The method according to claim 8, further comprising adding a fibrous material to the prepolymer.

14. The method according to claim 13, wherein the fibrous material is a reinforcing fiber.

15. The method according to claim 8, further comprising adding a filler to the prepolymer.

16. A method of producing polyarylene sulfide comprising:
providing a polyarylene sulfide prepolymer having a weight average molecular weight less than 10,000 and which contains at least 50 wt % or more of a cyclic polyarylene sulfide; and
heating the prepolymers to be, converted to a polymer of which weight average molecular weight is 10,000 or more,
wherein an obtained polyarylene sulfide has a weight average molecular weight of 10,000 or more, a polydispersity expressed as weight average molecular weight/number average molecular weight is 2.5 or less, weight loss when heated that satisfies the following equation:

$$\Delta Wr=(W1-W2)/W1\times100\leq0.18(\%)$$

(where, $\Delta Wr$ is a weight loss ratio (%) and is determined from a sample weight (W2) at 330° C. and a sample weight (W1) at 100° C., when a thermogravimetric analysis is carried out from 50° C. to a predetermined temperature of 330° C. or more at a heating rate of 20° C/min in non-oxidizing atmosphere under ambient pressure) wherein the alkali metal content is 100 ppm or less.

17. A method of producing polyarylene sulfide comprising:
providing a polyarylene sulfide prepolymer having a weight average molecular weight less than 10,000 and which contains at least 50wt % or more of a cyclic polyarylene sulfide; and
heating the prepolymers in the absence of a catalyst to be converted to a polymer of which weight average molecular weight is 10,000 or more,
wherein an obtained polyarylene sulfide has a weight average molecular weight of 10,000 or more, a polydispersity expressed as weight average molecular weight/number average molecular weight is 2.5 or less, weight loss when heated that satisfies the following equation:

$$\Delta Wr=(W1-W2)/W1\times100\leq0.18(\%)$$

(where, $\Delta Wr$ is a weight loss ratio (%) and is determined from a sample weight (W2) at 330° C. and a sample weight (W1) at 100° C., when a thermogravimetric analysis is carried out from 50° C. to a predetermined temperature of 330° C. or more at a heating rate of 20° C/min in non-oxidizing atmosphere under ambient pressure).

18. The method according to either of claim 16 or 17, further comprising during heating, controlling an amount of alkali metal to 100 ppm or less and a weight of disulfide with respect to total sulfur weight to less than 1 wt %.

19. The method according to either of claim 16 or 17, wherein the heating is carried out in a non-oxidizing atmosphere.

20. The method according to either of claim 16 or 17, wherein the heating is carried out under reduced pressure condition.

21. The method according to either of claim 16 or 17, wherein the polyarylene sulfide prepolymer is in a molten state during heating.

22. The method according to either of claim 16 or 17, further comprising adding a fibrous material to the prepolymer.

23. The method according to either of claim 16 or 17, wherein the fibrous material is a reinforcing fiber.

24. The method according to either of claim 16 or 17, further comprising adding a filler to the prepolymer.

* * * * *